United States Patent [19]

Shinno et al.

[11] Patent Number: 5,319,627
[45] Date of Patent: Jun. 7, 1994

[54] METHOD FOR MANAGING A DEFECT IN AN OPTICAL DISK BY ASSIGNING LOGICAL ADDRESSES BASED UPON CUMULATIVE NUMBER OF DEFECTS IN THE DISK

[75] Inventors: Atsushi Shinno, Chigasaki; Keiji Ueki, Zama; Motoyasu Ohno, Tokyo, all of Japan

[73] Assignee: Matsushita Graphic Communication System, Inc., Tokyo, Japan

[21] Appl. No.: 787,202

[22] Filed: Nov. 4, 1991

[51] Int. Cl.⁵ ............................................. G11B 7/00
[52] U.S. Cl. ...................................... 369/54; 369/32; 369/48; 369/58
[58] Field of Search .................. 369/32, 44.28, 47–48, 369/50, 54, 58, 124; 360/78.04, 78.14; 364/245.3 MS, 970.1 MS; 395/425 MS

[56] References Cited

U.S. PATENT DOCUMENTS

| | | | |
|---|---|---|---|
| 4,839,879 | 6/1989 | Sawada et al. | 369/54 |
| 5,068,842 | 11/1991 | Naito | 369/48 X |
| 5,075,804 | 12/1991 | Deyring | 369/54 X |
| 5,130,969 | 7/1992 | Sako | 369/58 |

Primary Examiner—W. R. Young
Attorney, Agent, or Firm—Lowe, Price, LeBlanc & Becker

[57] ABSTRACT

A method for managing a defect in an optical disk employed in a recording/reproducing apparatus. The optical disk includes a data area and a preliminary area. Further, the data area includes sectors for storing data and the preliminary area includes alternate sectors for defective sectors occurring after initialization of the optical disk. In the optical disk, physical addresses are assigned to all of the sectors of the data area and the preliminary area in an ascending order. In contrast, logical addresses are assigned to the sectors in an ascending order skipping the defective sectors detected at the time of the initialization and the sectors of the preliminary area. The method for managing a defect in an optical disk comprises the steps of constructing a table in which a cumulative number of defective sectors detected at the time of the initialization of the optical disk and being present between a starting physical address of the optical disk and a sector subsequent to a defective sector is used as the logical address of the sector subsequent to the defective sector and of converting the logical address of a sector into the physical address thereof by using the table. Thereby even when a defective sector occurs in the optical disk, the logical address of a sector can easily be converted into the physical address thereof.

7 Claims, 11 Drawing Sheets

FIG. 1

| DMTB NO. | LBA TABLE | L/P CONVERSION TABLE | REPLACEMENT TABLE |
|---|---|---|---|
| 0 | 3 BYTES | 2 BYTES | 3 BYTES |
| 1 | | | |
| 2 | | | |
| 3 | | | |
| 4 | | | |
| 5 | | | |
| 6 | | | |
| ⋯ | ⋯ | ⋯ | ⋯ |
| y-1 | | | |
| y | | | |

| DMTB NO. | LBA TABLE | L/P CONVERSION TABLE | REPLACEMENT TABLE |
|---|---|---|---|
| 0 | 0 | 0 | FFFFFF |
| 1 | 14 | 1 | FFFFFF |
| 2 | 32 | 2 | FFFFFF |
| 3 | 50 | 2 | 102 (PHYSICAL ADDRESS) |
| 4 | 74 | 2 | 103 (PHYSICAL ADDRESS) |
| 5 | 100 | 14 | FFFFFF |
| 6 |  |  |  |
| 7 |  |  |  |

FIG. 8

| | |
|---|---|
| BLOCK NO. OF ZONE φ | 0 0 |
| BLOCK NO. OF ZONE 1 | 0 5 |
| FINAL REGISTRATION BLOCK NO. | 0 5 |

FIG. 9

| | |
|---|---|
| OFFSET VALUE OF ZONE φ | 0 0 |
| OFFSET VALUE OF ZONE 1 | 1 2 |

FIG. 10

| ZONE φ | ZONE 1 |
|---|---|
| 0 1 | 0 0 |
| 0 1 | 0 0 |
| 0 0 | 0 0 |
| 0 0 | 0 0 |
| F F | 0 0 |
| 0 0 | 0 0 |
| 0 0 | 0 0 |
| 0 0 | 0 0 |
| F F | 0 0 |
| 0 0 | 0 0 |
| 0 0 | 0 0 |
| 0 0 | |
| 0 0 | |

01: ALREADY USED

00: AVAILABLE

FF: DETECTIVE SPARE AREA

METHOD FOR MANAGING A DEFECT IN AN OPTICAL DISK BY ASSIGNING LOGICAL ADDRESSES BASED UPON CUMULATIVE NUMBER OF DEFECTS IN THE DISK

BACKGROUND OF THE INVENTION

1. Field of The Invention

This invention relates to a method for managing a defect in a storage medium (for example, an optical disk (or optical disc)), by which a logical addres is converted into a physical address when the defect occurs in the storage medium.

2. Description of The Related Art

Generally, a storage region in a storage medium such as an optical disk is composed of a user area to be used by an user of a host system, a spare area (or preliminary area) to be used instead of a defective sector other than an initially defective sector which has already been defective at the time of forwarding the storage medium (e.g., an optical disk) and a management area to be used for managing information to be stored in an alternate area. Further, there are the following conventional methods for managing defects in a storage medium: Sector slipping Defect Management method (hereunder abbreviated as SDM); and Linear replacement Defect Management method (hereunder abbreviated as LDM).

SDM is a method for removing a defective sector from an optical disk before a user uses the storage medium for the first time. With this method, logical addresses to be used for accessing the optical disk by the host system are assigned to track numbers of tracks and sector numbers of sectors physically managed in the optical disk other than defective sectors determined by Certification and spare sectors (i.e., preliminary sectors). Incidentally, Certification is an operation of detecting initially defective sectors and correcting defective areas by performing a deletion operation, a write operation and a verification operation on all storage areas of an optical disk.

LDM is a method for removing a defective sector from an optical disk when the defective sector occurs therein after SDM has been performed thereon.

Figure 14:
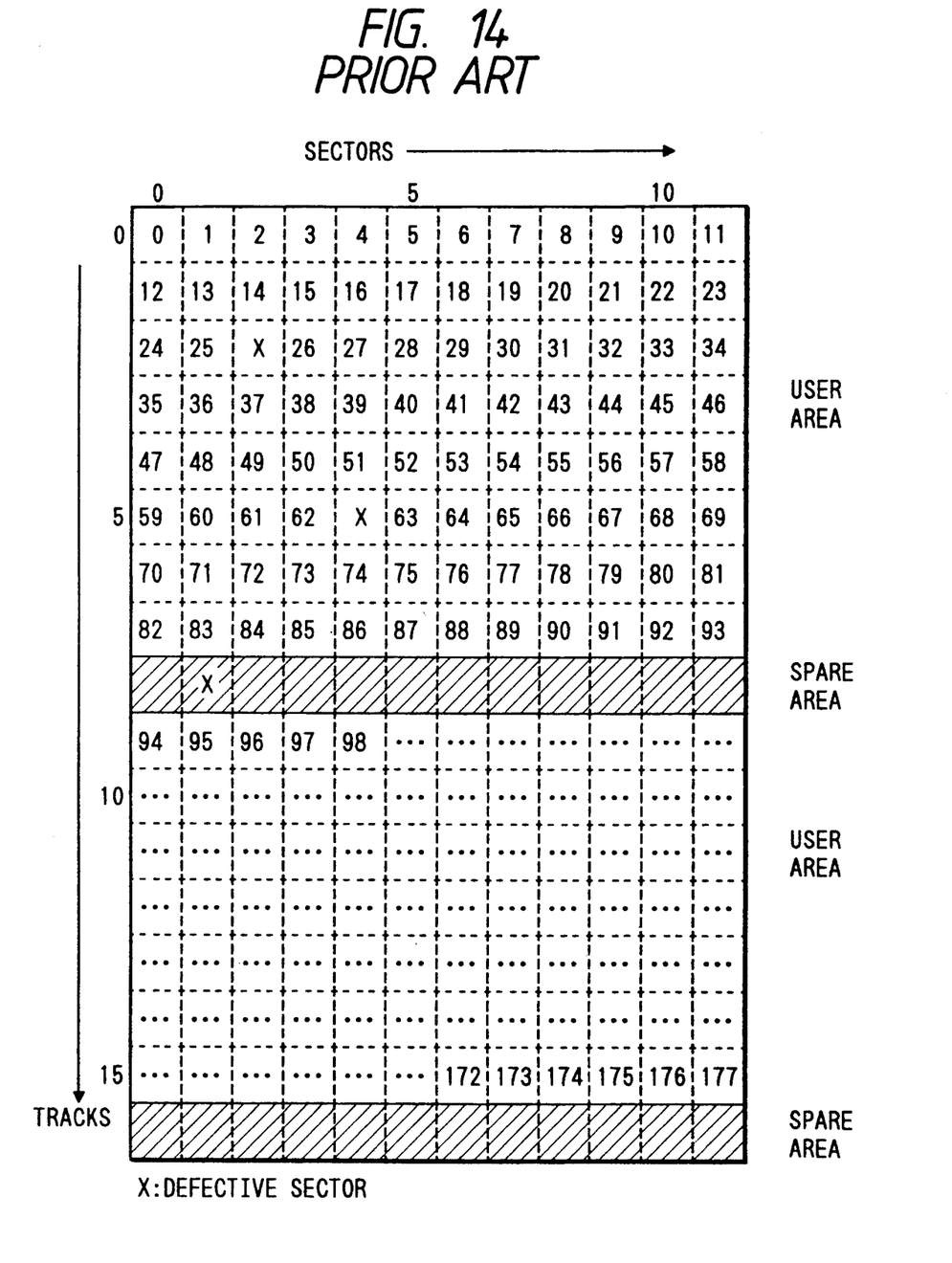
FIGS. 14 and 15 are diagrams for illustrating a processing of defect sectors.
Figure 15:
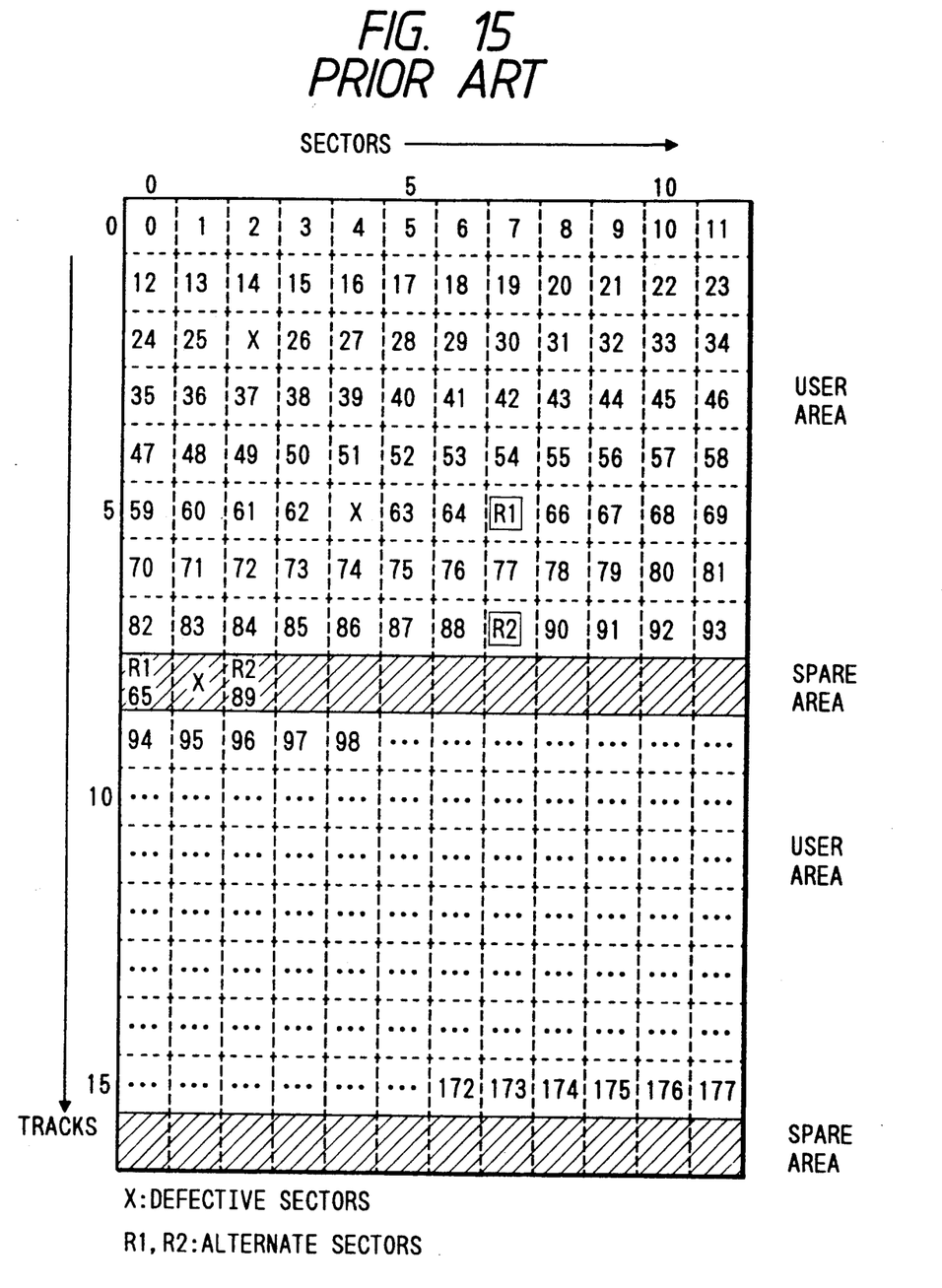

Hereinafter, an example of a defect management operation effected by applying LDM to an optical disk will be described by FIGS. 14 and 15. FIGS. 14 and 15 illustrate algorithms for managing a defect in what is called a full-RAM optical disk which is erasable and re-writable and is now under discussion in International Standardization Organization (ISO). FIG. 14 shows a state of a storage region of an optical disk on which SDM is of a storage region of an optical disk on which SDM is performed.

In FIG. 14, each reference numeral (i.e., 0, 1, ... or 177) corresponding to a combination of a physical track number (hereunder sometimes referred to as a physical track address) and a physical sector number (hereunder sometimes referred to as a physical sector address) indicates a logical number (hereunder sometimes referred to as a logical address) assigned to a location of a storage region. For instance, a logical address 25 is indicated at and assigned to a location corresponding to the combination of a physical track address 2 and a physical sector address 1. As is seen from this figure, no logical address is assigned to a a defective sector which is represented by St. Andrew's cross x (for example, a sector indicated by the combination of a physical track address 2 and a physical sector address 2), a logical address is assigned to the next sector (namely, a logical address 26 is assigned to a sector indicated by the combination of a physical track address 2 and a physical sector address 3 which is next to this defective sector in the example).

FIG. 15 illustrates a state of an optical disk on which LDM is performed. As is shown in FIG. 15, data to be written to a sector R1 corresponding to the combination of a physical track address 5 and a physical track address, which becomes defective after SDM is performed, is stored in a sector corresponding to a physical track address (hereunder sometimes referred to simply as a track address) 8 and a physical sector address (hereunder sometimes referred to simply as a sector address) 0 of a spare area together with a logical address 65. This results in that when a sector having the logical address 65 is accessed by a host computer or system, the sector indicated by the combination of the track address 8 and the sector 0 is practically accessed. Further, when an alternate sector for a defective sector R2 indicated by the combination of the track address 7 and the sector address 7 is allotted to a sector of a spare area, a defective sector corresponding to a track address 8 and a sector address 1 is not used as the alternate sector and a logical address 89 is assigned to the next sector corresponding to the track address 8 and the sector address 2.

Figure 16:
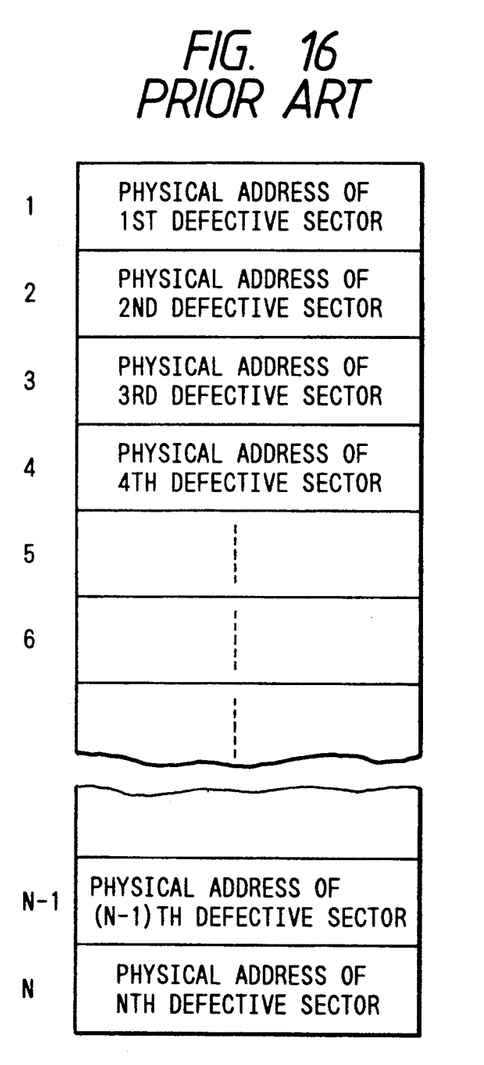
FIG. 16 is a diagram for illustrating a conventional defect area table.
Figure 17:
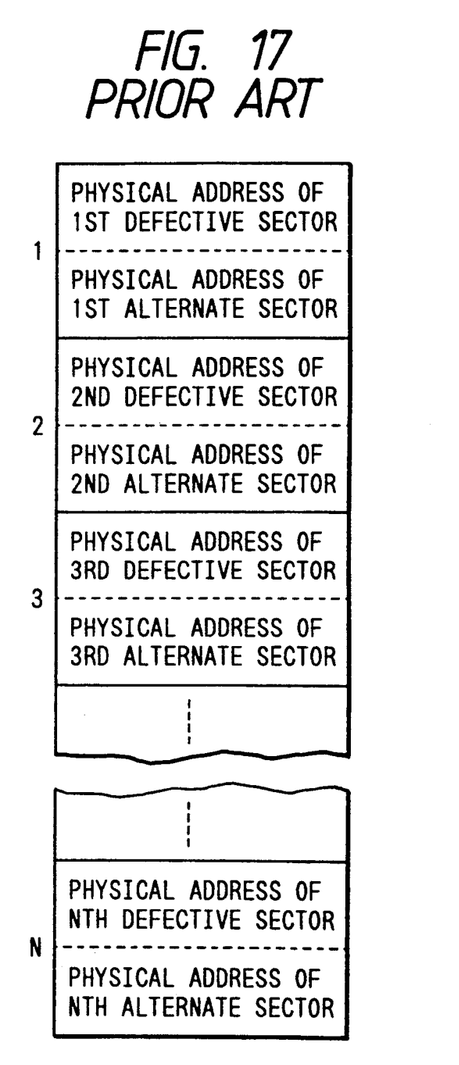
FIG. 17 is a diagram for illustrating a conventional replacement area table.

It is necessary for effecting such a defect management method to convert a logical number (i.e., a logical address) into a physical number (i.e., a physical address). Therefore, in case of performing SDM in a conventional device, a defect area table as illustrated in FIG. 16 is used for conversion of logical addresses into physical addresses. Further, in case of performing LDM in a conventional device, a replacement table as illustrated in FIG. 17 is used for conversion of logical addresses into physical addresses.

FIG. 16 illustrates the defect area table in which physical addresses of defect sectors detected at the time of initialization of an optical disk are arranged in ascending order thereof. FIG. 17 shows the replacement table in which physical addresses of defect sectors detected at the time of initialization of an optical disk, as well as physical addresses of alternate sectors of a spare area for these defect sectors, are arranged in ascending order thereof. When converting logical addresses into physical addresses by using these tables, comparison of each of physical addresses (i.e., serial numbers respectively assigned to sectors arranged from left to right and from top to bottom in cases of FIGS. 14 and 15) of defective sectors recorded in the defect area table with a given logical address is started from Row or Cell 1 of the defect area table. Thus it is detected or determined how many defect sectors of which the physical addresses are less than the given logical address are present. Then, a physical address corresponding to the given logical address is calculated by adding the determined number of the defective sectors to the given logical address. Simultaneously, the replacement table is retrieved, considering whether or not a sector corresponding to the calculated physical address is replaced with an alternate sector.

In case of read and write operations of a conventional device employing such a conversion method, when a starting logical address and a transmission block number (i.e., the number of blocks to be transmitted) are given, there is the necessity of performing the above described conversion within the range of the number of blocks to be transmitted (hereunder sometimes referred to as transmission blocks). Moreover, in case where user areas are divided into zones, the number of spare areas contained in each zone and defects contained in each spare area should be taken into consideration. Consequently, the process of the conversion becomes very complex.

The present invention is accomplished to eliminate the above described drawbacks of the prior art.

It is, accordingly, an object of the present invention to provide a method for managing a defect in a storage medium, which can easily convert a logical address into a physical address.

SUMMARY OF THE INVENTION

To achieve the foregoing object and in accordance with an aspect of the present invention, there is provided a method for managing a defect in an optical disk employed in a recording/reproducing apparatus, the optical disk having a data area and a preliminary area, the data area including sectors for storing data, the preliminary area including alternate sectors for defective sectors occurring after being used, physical addresses being assigned to all of the sectors of the data area and the preliminary area in an ascending order, logical addresses being assigned to the sectors other than defective sectors detected at the time of the initialization and other than the sectors of the preliminary area in an ascending order skipping over the defective sectors detected before being used and the sectors of the preliminary area, the method for managing a defect in an optical disk comprising the steps of constructing a table wherein are listed (1) a logical address assigned to a sector just subsequent to each of defective sectors detected before being used and (2) a cumulative number of defective sectors which are detected before being used and are present between a starting physical address of said optical disk and the logical address between a starting physical address of the optical disk and and of converting a logical address of a sector into a physical address thereof by using the table.

Thereby, even in case where a defective sector occurs in the optical disk, the logical address of a sector can easily be converted into the physical address thereof.

In accordance with another aspect of the present invention, there is provided a method for managing a defect in an optical disk employed in a recording/reproducing apparatus, the optical disk having a data area and a preliminary area, the data area including sectors for storing data, the preliminary area including alternate sectors for defective sectors occurring after being used, physical addresses being assigned to all of the sectors of the data area and the preliminary an area in an ascending order, logical addresses being assigned to the sectors other than defective sectors detected before being used and other than the sectors of the preliminary area in an ascending order by skipping over defective sectors detected before being used and the sectors of the preliminary area, the method for managing a defect in an optical disk comprising the steps of constructing a table wherein are listed (1) a logical address assigned to a sector just subsequent to each of defective sectors detected before being used and (2) a cumulative number of defective sectors which are detected before being used and are present between a starting physical address of said optical disk and the logical address and converting a logical address of a sector into a physical address thereof by searching the table for a logical address which is nearest to and not more than the logical address of the sector, and then reading a cumulative number of defective sectors corresponding to the found logical address from the table and finally adding the cumulative number of defective sectors to the logical address of the sector to be converted.

In accordance with further another aspect of the invention, there is provided a method for managing a defect in an optical disk employed in a recording/reproducing apparatus, the optical disk having a storage region which includes data areas and preliminary areas, the data area including sectors for storing data, the preliminary area including alternate sectors for defective sectors occurring after being used, physical addresses being assigned to all of the sectors of the data area and the preliminary area in an ascending order, logical addresses being assigned to the sectors other than defective sectors detected before being used and other than the sectors of the preliminary area in an ascending order by skipping over the defective sectors detected before being used and the sectors of the preliminary area, the method for managing a defect in an optical disk comprising the steps of dividing the storage region into a plurality of zones each having one of the data areas and one of the preliminary areas, of constructing a table wherein are listed (1) a logical address assigned to a sector just subsequent to each of defective sectors detected before being used and (2) a cumulative number of defective sectors which are detected before used and are present between a starting physical address of said optical disk and the logical address. and of converting a logical address of a sector into a physical address thereof by using the table.

In accordance with still another aspect of the present invention, there is provided a method for managing a defect in an optical disk employed in a recording/reproducing apparatus, the optical disk having a data area and a preliminary area, the data area including sectors for storing data, the preliminary area including alternate sectors for defective sectors occurring after being used, physical addresses being assigned to all of the sectors of the data area and the preliminary area in an ascending order, logical addresses being assigned to the sectors other than defective sectors detected before being used and other than the sectors of the preliminary area in an ascending order by slipping the defective sectors detected before being used and the sectors of the preliminary area, the method for managing a defect in an optical disk comprising the steps of constructing a table wherein are listed (1) a logical address assigned to a sector just subsequent to each of defective sectors detected before used and (2) a cumulative number of defective sectors which are detected before used and are present between a starting physical address of said optical disk and the logical address are listed when the defective sector is detected before being used and in which a physical address of an alternate address of a spare area is made to correspond to a defective sector when the defective sector is detected before being used and of converting a logical address of a sector into a physical address thereof by employing a physical address corresponding to the sector, of which the logical address should be converted, listed in the table as a physical address thereof in case where the sector, of which the logical address should be converted, is a defective sector detected before being used, and by searching the table for a logical address which is nearest to and not more than the logical address of the sector, and then reading a cumulative number of defective sectors corresponding to the found logical address from the table and finally adding the cumulative number of defective sectors to the logical address of the sector to be converted when the sector, of which the logical address should be converted, is a defective sector detected before being used.

In accordance with yet another aspect of the present invention, there is provided a method for managing a defect in an optical disk employed in a recording/reproducing apparatus, the optical disk having a data area and a preliminary area, the data area including sectors for storing data, the preliminary area including alternate sectors for defective sectors occurring after being used in the method including the step of increasing the number of the alternate sectors included in said preliminary area by the number of the defective sectors included in said preliminary area when said preliminary area has one or more defective sector detected before being used.

Thereby, all of alternate sectors of the number initially set by assuming that there are no defective sectors can be used.

BRIEF DESCRIPTION OF THE DRAWINGS

Other features, objects and advantages of the present invention will become apparent from the following description of a preferred embodiment with reference to the drawings in which like reference characters designate like or corresponding parts throughout several views, and in which.

DETAILED DESCRIPTION OF THE PREFERRED EMBODIMENT

Hereinafter, a preferred embodiment of the present invention will be described in detail by referring to the accompanying drawings.

Figure 1:
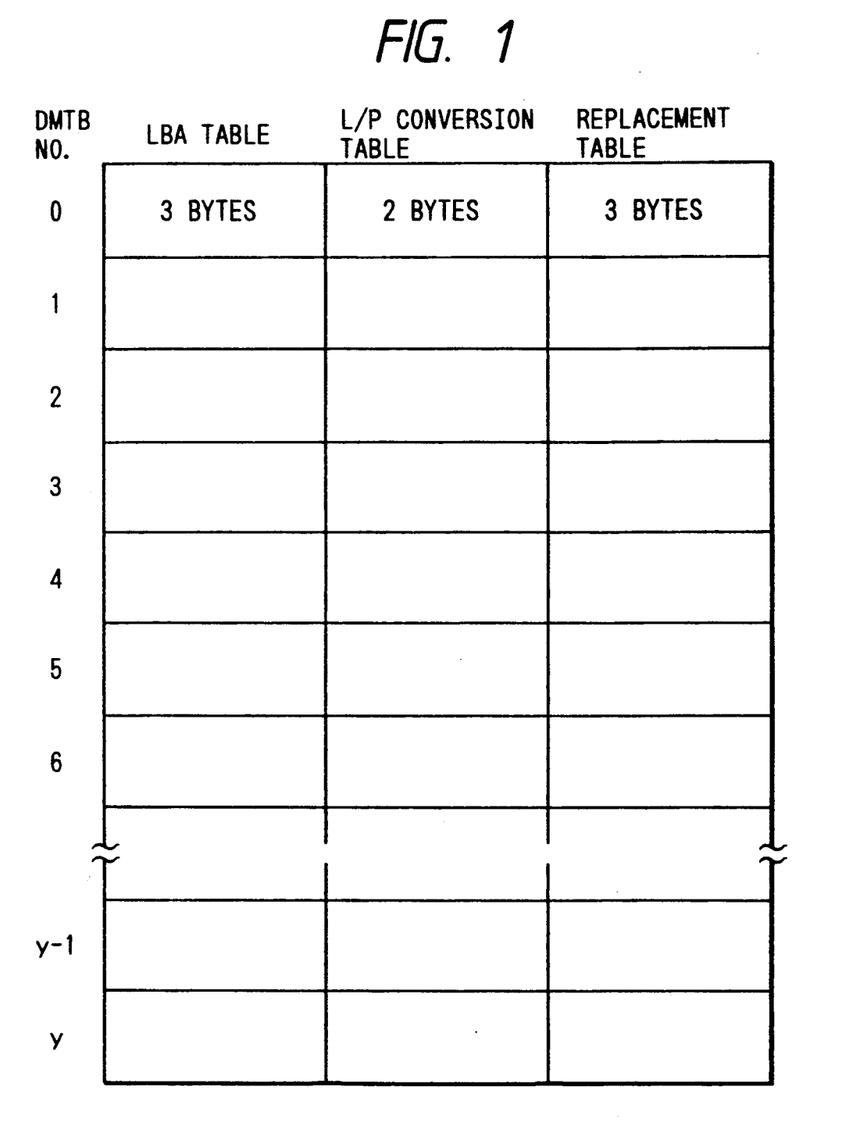
FIG. 1 is a diagram for illustrating the format of a defect management chart employed in an embodiment of the present invention.

FIG. 1 illustrates a defect management chart or table employed in the preferred embodiment of the present invention. This defect management table is composed of a logical block address (hereunder sometimes abbreviated as LBA or referred to simply as logical address) table, a logical-address/physical-address conversion (L/P) table and a replacement table. Namely, as is shown in this figure, each row (hereunder sometimes referred to as a defect management table block (DMTB)) of the defect management table is comprised of corresponding rows of the LBA table, the logical-address/physical-address conversion table and the replacement table. Further, in the defect management table, DMTBs are arranged from top to bottom in ascending order of a logical address.

Each row or cell of the LBA table represents a physical sector (hereunder sometimes referred to simply as a sector) subsequent to a slipped or skipped sector such as a sector (i.e., an alternate sector), with which the skipped sector is replaced, by using a logical address.

Moreover, each row or cell of the logical-address/physical-address conversion table represents the number of defect sectors or areas which are present between a starting logical address and the logical address represented by a corresponding row of the LBA table.

The replacement table is used to determine which skipped sector and an alternate sector the sector corresponding to the logical address indicated by each row of the LBA table is. In case where the sector corresponding to the logical address indicated by a row of the LBA table is an alternate sector, the physical address of the alternate sector is stored in the corresponding row of the replacement table.

Figure 2:
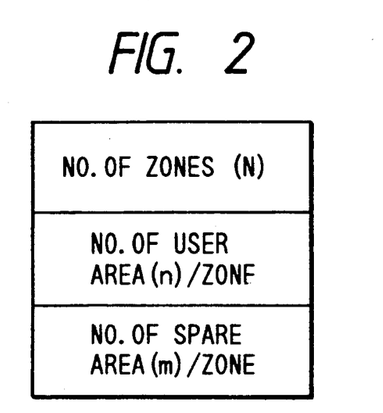
FIG. 2 is a diagram for illustrating the format of a zone division table.

FIG. 2 illustrates a zone division table. As shown in this figure, the number N of zones into which user areas are divided, the number n of user areas of each zone and the number m of spare areas of each zone are set in the zone division table.

Figure 3:
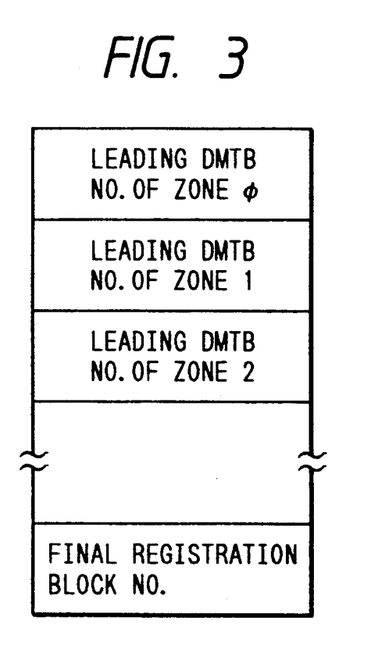
FIG. 3 is a diagram for illustrating the format of a zone pointer table.

FIG. 3 illustrates a zone pointer table. In this table, the defect management table block (DMTB) No. corresponding to the leading address of each of zones, into which user areas are divided, and a final registration block No. are set.

Figure 4:
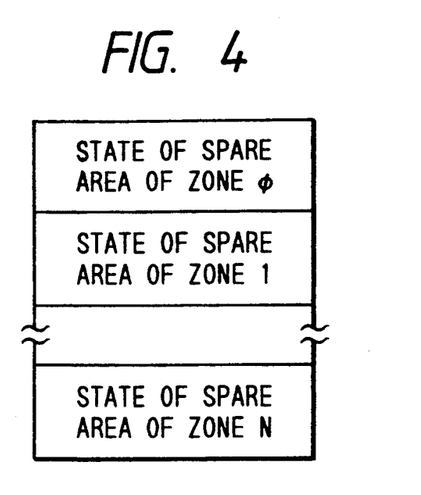
FIG. 4 is a diagram for illustrating the format of a spare area table.

FIG. 4 illustrates a spare area table which indicates states of spare areas respectively corresponding to zones. In this table, an nth row stores data, each byte of which indicates the state of each spare sector of the spare area corresponding to an nth zone (namely, whether the corresponding spare sector is being used, or presently available or defective).

Figure 5:
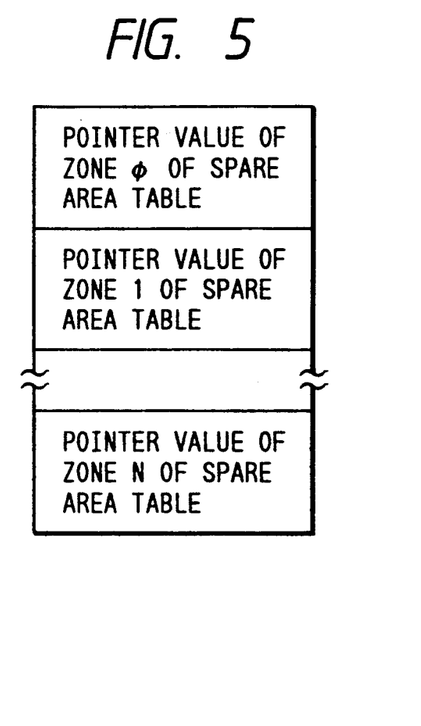
FIG. 5 is a diagram for illustrating the format of a spare-area pointer table.

FIG. 5 illustrates a spare area pointer table, an nth row of which stores data indicating the leading address of the first or leading one of spare areas of an nth zone.

Next, an practical example of the defect management employing the above described tables will be described hereinbelow by referring to FIG. 6.

In case of this example, it is assumed that the number N of zones into which user areas are divided, the number n of user areas of each zone and the number m of spare areas of each zone are 2, 100 and 10, respectively. Moreover, it is also supposed that there are two skipped sectors (i.e., two defective sectors indicated by Andrew's crosses just prior to sectors having logical addresses 14 and 32, respectively) and two sectors (hereunder sometimes referred to as replacement sectors) which are replaced with alternate or spare sectors and have logical addresses 50 and 74 and that there are two skipped sectors in a spare area of a zone 0. This state of an optical disk is represented by the defect management table, the contents of which are changed from those as illustrated in FIG. 1 to those as illustrated in FIG. 7. Incidentally, a hexadecimal "replacement value" of FFFFFF is written to a row of the replacement table corresponding to a skipped sector. In FIG. 6, reference numerals described in cells indicate logical addresses; reference numerals described in parenthesis indicate physical addresses; Andrew's crosses ( x) defective sectors; reference characters R1 and R2 replacement sectors (i.e., sectors replaced with alternate sectors). In the spare area of the zone 0, alternate sectors R1 and R4 respectively having logical addresses 50 and 74 are set. Further, as shown in this figure, there are two skipped sectors (i.e., defective sectors) indicated by the crosses x in this spare area. The number of sectors of this spare area is 10. This results in that only the remaining eight sectors can actually be used as alternate sectors. Therefore, the number of sectors of this spare area is changed into 12, so that the number of actually available alternate sectors become 10 as if there were no defective sectors in this spare area. Thereby, as illustrated in FIG. 7, a physical address indicated in a row of the logical-address/physical-address conversion table corresponding to the defect management table block (DMTB) No. 5 (namely, corresponding to a logical address 100 indicated in the corresponding row of the LBA table) becomes 114. This is owing to the facts that the number of defective sectors indicated by crosses x in a user area of which sectors have logical addresses of from 0 to 99 is 2, that the number of alternate sectors of this spare area is 10 and that the number of defective sectors of this spare area indicated by crosses x is also 2.

Figure 8:
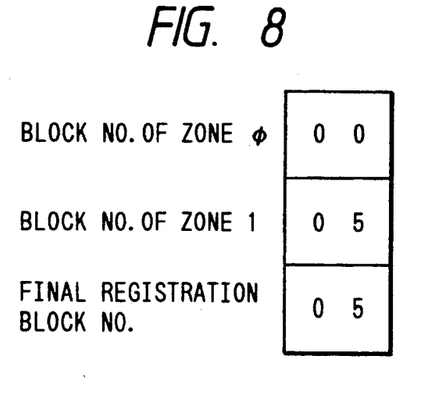
FIG. 8 is a diagram for illustrating a practical example of the contents of the zone pointer table.

FIG. 8 illustrates a zone pointer table in which a leading block No. (00) of a zone 0, a leading block No. (05) of a zone 1 and a final registration block No. (05) are set.

Figure 9:
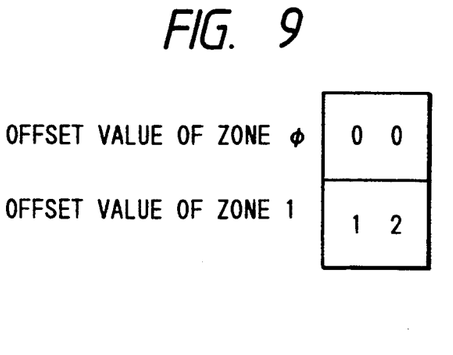
FIG. 9 is a diagram for illustrating a practical example of the contents of the spare-area pointer table.
Figure 10:
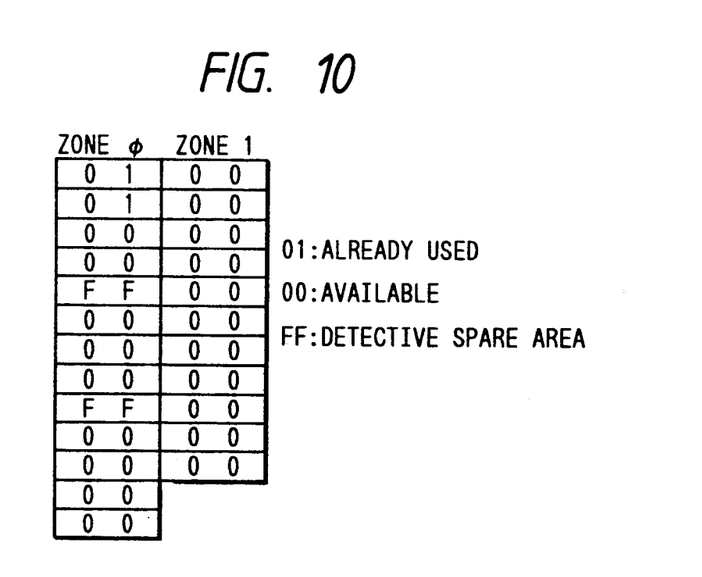

FIG. 9 illustrates a spare area pointer table, each cell of which indicates the value of an offset (hereunder sometimes referred to simply as an offset value) of a top cell of a column corresponding to a corresponding zone from a starting cell of a spare area table of FIG. 10 in bytes. For instance, the top row or cell of the spare area pointer table indicates the offset value corresponding to the zone 0 (i.e., 0 in this case) and the next row thereof indicates the offset value corresponding to the zone 1 (i.e., 12 bytes in this case). This is because of the fact that the spare area of the zone 0 includes two defective sectors and thus twelve sectors in total.

Figure 6:
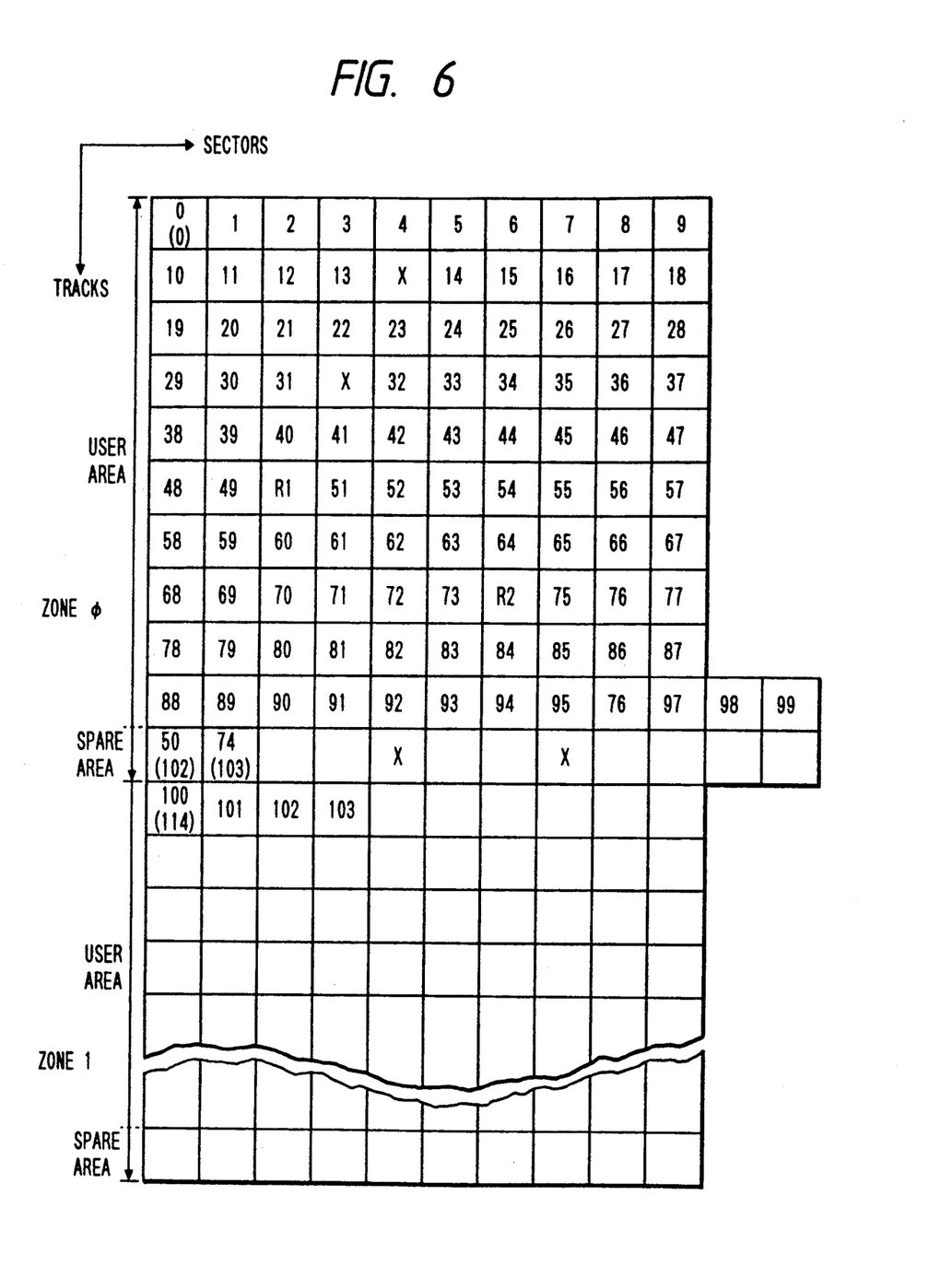
FIG. 6 is a diagram for illustrating a practical example of the assignment of logical addresses to physical sectors of zone areas and spare areas.
Figure 7:
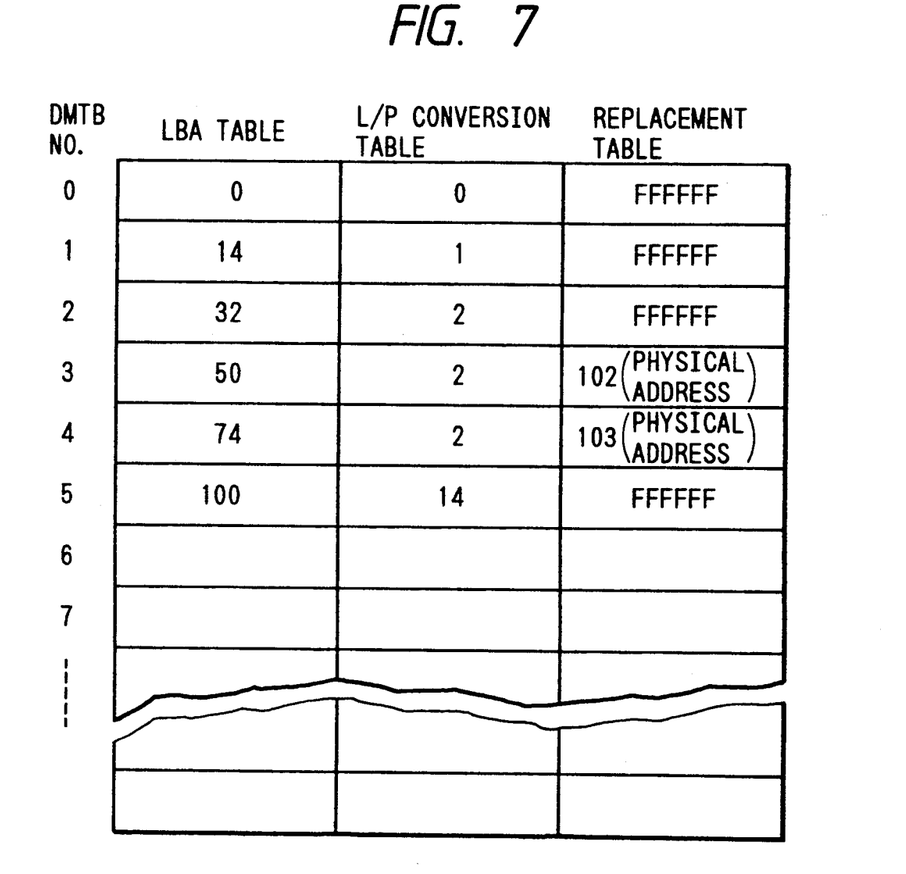
FIG. 7 is a diagram for illustrating a practical example of the contents of the defect management chart.

FIG. 10 illustrates the spare area table, a first column of which indicates the state of the spare area of the zone 0 of FIG. 6.

Next, a process of converting logical addresses into physical addresses will be explained hereinbelow by referring to the above described tables.

Figure 11:
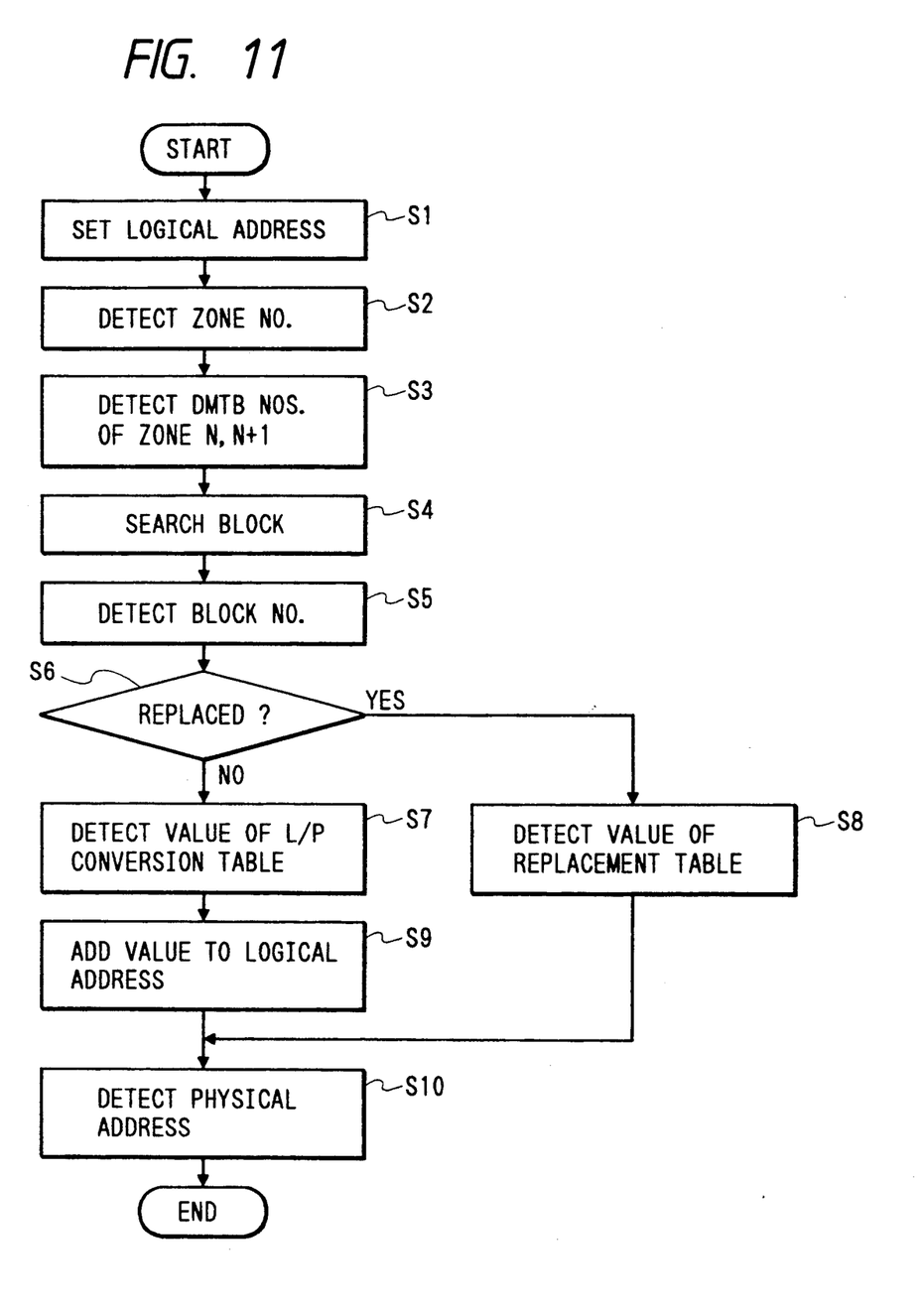
FIG. 11 is a flowchart of a program for converting logical addresses to physical addresses.

FIG. 11 is a flowchart of a program for performing the conversion of logical addresses to physical addresses. First, if 40 is indicated or set by a user as a logical address to be converted in step S1, it is then detected in step S2 that a zone including a sector to which this logical address is assigned is the zone 0. Next, in step S3, the defect management table block (DMTB) Nos. 0 and 5 corresponding to the zones 0 and 1 are read from the zone pointer table of FIG. 8. Thereafter, in steps S4 and S5, the logical addresses (i.e., LBAs) stored in the rows of the LBA table corresponding to the DMTB Nos. 0 to 5 are compared with the logical address 40 so as to detect the DMTB No. (i.e., 2 in this case) corresponding to the row, in which the logical address less than and nearest to 40 is stored, of the LBA table. Then, the value (i.e., 2 in this case) indicated by the row of the logical-address/physical-address conversion table corresponding to the DMTB No. 2 is read in step S7. Subsequently, in steps S9 and S10, a physical address (42) is obtained by adding this value (2) to the logical address 40 (namely, 40+2=42). If it is found in step S6 that a sector corresponding to the logical address set in step S1 is a replacement sector, the physical address into which this logical address should be converted is obtained from the replacement table in step S8.

The logical-address/physical-address conversion can easily be achieved by utilizing the defect management table in the above described manner.

Figure 12:
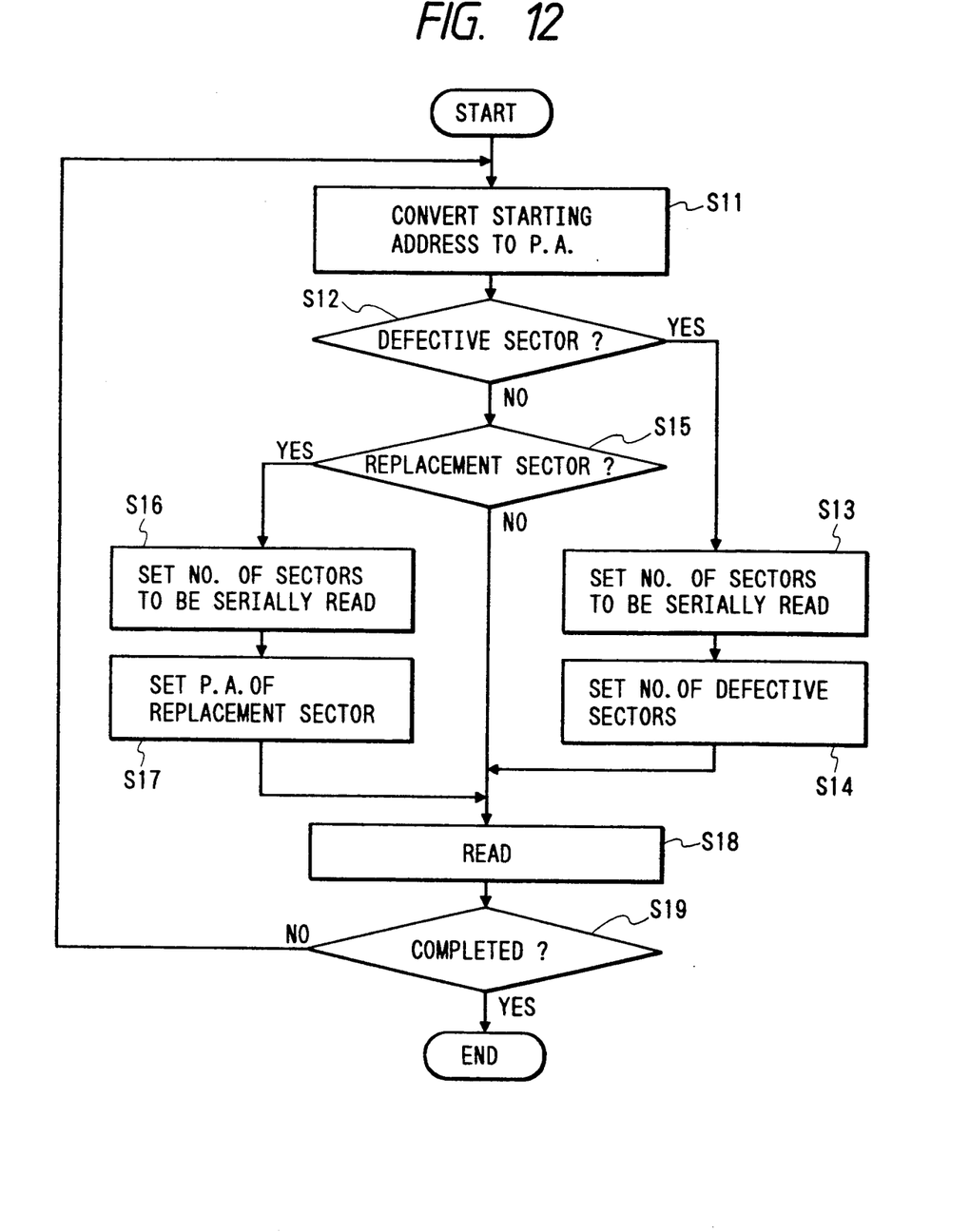
FIG. 12 is a flowchart of a program for performing a read operation.

Next, a process of performing a read operation will be described hereinafter by referring to FIG. 12 which is a flowchart of a program for performing the read operation. First, when a starting LBA, at which a read operation is started, and transmission blocks are indicated, the starting LBA is converted into a physical address in step S11. If it is found in step S12 that transmission blocks include a slipped sector (i.e., a defective sector), information on the number of sectors arranged from the starting LBA to a sector just prior to the slipped sector, which can serially be read, is obtained from the defect management table and is set in step S13. Subsequently, information on the number of the slipped sector and defective sectors subsequent to the slipped sector is set in step S14. Then, based on the information set in steps S13 and S14, the following read operation is effected using physical addresses in step S18. Namely, sectors of the number indicated by the information set in step S13 are first read. Then, sectors of the number indicated by the information set in step S14 are skipped and the remaining sectors are read. Subsequently, in step S19, it is checked in step S19 whether or not the read operation should be completed. If not, the starting LBA and the transmission blocks are updated and thereafter the operation or process comprised of steps S12 to S19 is repeated. Similarly, in case where it is found in step S15 that there is a replacement sector in the transmission blocks, information on the number of sectors arranged from the starting LBA to a sector just prior to the replacement sector, which can be serially read, is set in step S16. Then, information on the physical address of an alternate sector corresponding to the replacement sector is set in step S17. Thereafter, the above described process is repeated.

Thus, even in case where a slipped sector or a replacement sector is present in transmission blocks, an read operation can easily effected by performing the above described process.

Figure 13:
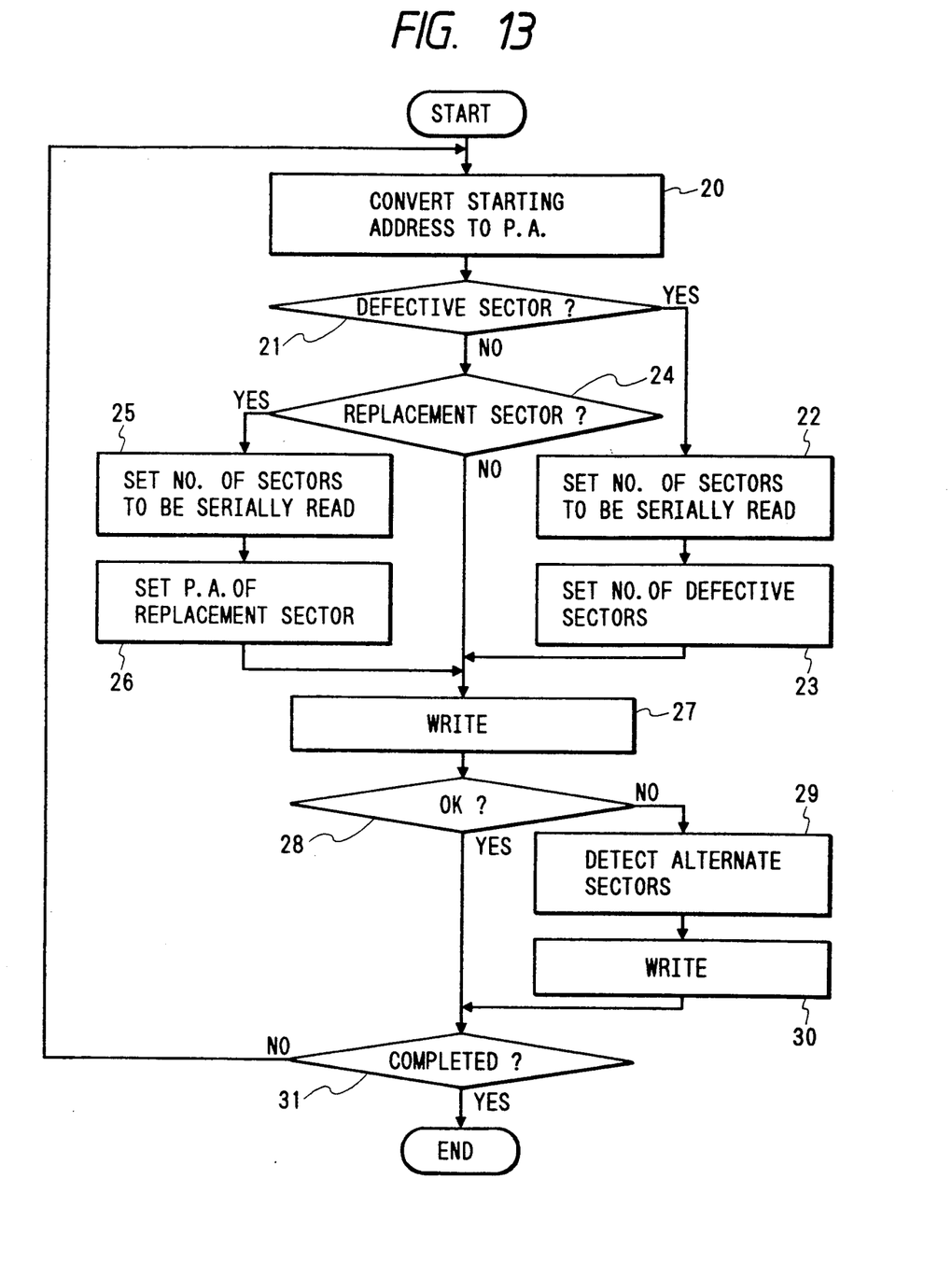
FIG. 13 is a flowchart of a program for performing a write operation.

Next, a process of performing a write operation will be described hereinafter by referring to FIG. 13 which is a flowchart of a program for performing the write operation. The process of performing a write operation is similar to that of performing a read operation. Thus only the difference between the process of performing a write operation and that of performing a read operation will be described hereinbelow. Namely, in case where it turns out in step S28 as the result of a verify check or write check that there occur a failed write operation on a sector (hereunder referred to as a failed sector), an alternate sector is detected in step S29 as follows. First, the offset value of a cell of the spare area table corresponding to the leading sector of the spare area of a zone, in which the failed sector is included, from the leading cell of the space area table is obtained from the value (hereunder sometimes referred to as a spare area pointer value) a row or cell of the spare area pointer table corresponding to the zone. Then, by referring to the spare area table by using the offset value, it is detected which one of spare sectors corresponding to the zone can be used as an alternate sector for the failed sector.

For example, when a write operation on a sector of the zone 0 fails and an alternate sector should be detected, the spare area pointer value corresponding to the zone 0 is 00 as is seen from FIG. 9. Thus, the offset value of the zone 0 from the leading cell of the spare area table of FIG. 10 is 0. Subsequently, cells of the column of the spare area table of FIG. 10 corresponding to the zone 0 are serially checked from the top or leading cell thereof. As the result, it turns out that the third cell of the column corresponding to the zone 0 indicates a value 00 and that thus the third spare sector of the spare area of the zone 0 can be used as the alternate sector. Therefore, the physical address of the alternate sector turns out to be 104 which is obtained by 102+2=104 (namely, by adding the leading physical address 102 of the spare area of the zone 0 to the value 2 of the offset or difference between the physical address of the third spare sector and that of the leading spare sector of the spare area of the zone 0. Incidentally, even in case where a slipped sector is included in the spare area, the physical address of the alternate sector can easily be obtained by performing a similar process.

While a preferred embodiment of the present invention has been described above, it is to be understood that the present invention is not limited thereto and that other modifications will be apparent to those skilled in the art without departing from the spirit of the invention. The scope of the present invention, therefore, is to be determined solely by the appended claims.

What is claimed is:

1. A method for managing a defect in an optical disk employed in a recording/reproducing apparatus, said optical disk having a data area and a preliminary area, said data area including sectors for storing data, said preliminary area including alternate sectors for defective sectors occurring after being used, physical addresses being assigned to all of the sectors of said data area and said preliminary area in an ascending order, logical addresses being assigned to the sectors other than defective sectors detected at the time of the initialization and other than the sectors of said preliminary area in an ascending order by skipping over the defective sectors detected before being used and the sectors of said preliminary area, said method for managing a defect in an optical disk comprising the steps of:

constructing a table wherein are listed (1) a logical address assigned to a sector just subsequent to each of defective sectors detected before being used and (2) a cumulative number of defective sectors which are detected before being used and are present between a starting physical address of said optical disk and the logical address; and converting a logical address of a sector into a physical address thereof by using said table.

2. The method for managing a defect in an optical disk as set forth in claim 1, wherein the step of constructing the table further includes the sub-steps of:

writing to the table data indicating whether each defective sector is detected before or after being used; and writing a physical address of an alternate sector corresponding to each defective sector detected after being used, and wherein the step of converting a logical address of a sector further includes a sub-step of determining a physical address of the sector to be converted as a physical address of an alternate sector corresponding to the logical address of the sector to be converted, if the logical address of the sector to be converted is found in the table as the logical address corresponding to a defective sector detected after being used.

3. A method for managing a defect in an optical disk employed in a recording/reproducing apparatus, said optical disk having a data area and a preliminary area, said data area including sectors for storing data, said preliminary area including alternate sectors for defective sectors occurring after being used, physical addresses being assigned to all of the sectors of said data area and said preliminary area in an ascending order, logical addresses being assigned to the sectors other than defective sectors detected before being used and other than the sectors of said preliminary area in an ascending order by skipping over the defective sectors detected before being used and the sectors of said preliminary area, said method for managing a defect in an optical disk comprising the steps of:

constructing a table wherein are listed (1) a logical address assigned to a sector just subsequent to each of defective sectors detected before being used and (2) a cumulative number of defective sectors which are detected before being used and are present between a starting physical address of said optical disk and the logical address; and converting a logical address of a sector into a physical address thereof by searching the table for a logical address which is nearest to and not more than the logical address of the sector, and then reading a cumulative number of defective sectors corresponding to the found logical address from the table and finally adding the cumulative number of defective sectors to the logical address of the sector to be converted.

4. The method for managing a defect in an optical disk as set forth in claim 3, wherein the step of constructing the table further includes sub-steps of:

writing to the table data indicating whether each defective sector is detected before or after being used; and writing a physical address of an alternate sector corresponding to each defective sector detected after being used; and wherein the step of converting a logical step of a sector further includes a sub-step of determining a physical address of the sector to be converted as a physical address of an alternate sector corresponding to the logical address of the sector to be converted, if the logical address of the sector to be converted is found in the table as the logical address corresponding to a defective sector detected after being used.

5. A method for managing a defect in an optical disk employed in a recording/reproducing apparatus, said optical disk having a storage region which includes data areas and preliminary areas, said data area including sectors for storing data, said preliminary area including alternate sectors for defective sectors occurring after being used, physical addresses being assigned to all of the sectors of said data area and said preliminary area in an ascending order, logical addresses being assigned to the sectors other than defective sectors detected before being used and other than defective sectors detected at the time of the initialization and other than the sectors of said preliminary area in an ascending order by skipping over the defective sectors detected before being used and the sectors of said preliminary area, said method for managing a defect in an optical disk comprising the steps of:

dividing the storage region into a plurality of zones each having one of the data areas and one of the preliminary areas;

constructing a table wherein are listed (1) a logical address assigned to a sector just subsequent to each of defective sectors detected before being used and (2) a cumulative number of defective sectors which are detected before being used and are present between a starting physical address of said optical disk and the logical address; and converting a logical address of a sector into a physical address thereof by using said table.

6. The method for managing a defect in an optical disk as set forth in claim 5, wherein the step of constructing the table further includes the sub-steps of:

writing to the table data indicating whether such defective sector is detected before or after used; and writing a physical address of an alternate sector corresponding to each defective sector detected after being used, and wherein the step of converting a logical step of a sector further includes a sub-step of determining a physical address of the sector to be converted as a physical address of an alternate sector corresponding to the logical address of the sector to be converted, if the logical address of the sector to be converted is found in the table as the logical address corresponding to a defective sector detected after being used.

7. A method for managing a defect in an optical disk employed in a recording/reproducing apparatus, said optical disk having a data area and a preliminary area, said data area including sectors for storing data, said preliminary area including alternate sectors for defective sectors occurring after being used, physical addresses being assigned to all of the sectors of said data area and said preliminary area in an ascending order, logical addresses being assigned to the sectors other than defective sectors detected before being used and other than the sectors of said preliminary area in an ascending order by skipping over the defective sectors detected before being used and the sectors of said preliminary area, said method for managing a defect in an optical disk comprising the steps of:

constructing a table wherein are listed (1) a logical address assigned to a sector just subsequent to each of defective sectors detected before being used and (2) a cumulative number of defective sectors which are detected before used and are present between a starting physical address of said optical disk and the logical address when the defective sector is detected before being used and in which a physical address of an alternate address of a spare area is made to correspond to a defective sector when the defective sector is detected after being used; and converting a logical address of a sector into a physical address thereof by employing a physical address corresponding to the sector, of which the logical address should be converted, listed in the table as a physical address thereof in case where the sector, of which the logical address should be converted, is a defective sector detected after being used, and by searching the table for a logical address which is nearest to and not more than the logical address of the sector, and then reading a cumulative number of defective sectors corresponding to the found logical address from the table and finally adding the cumulative number of defective sectors to the logical address of the sector to be converted when the sector, of which the logical address should be converted, is a defective sector detected before being used.

* * * * *